US012197162B2

(12) United States Patent
Mitomo et al.

(10) Patent No.: US 12,197,162 B2
(45) Date of Patent: Jan. 14, 2025

(54) CLEANING DEVICE AND POWDER PROCESSING APPARATUS USING SAME

(71) Applicant: FUJIFILM BUSINESS INNOVATION CORP., Tokyo (JP)

(72) Inventors: Kiho Mitomo, Kanagawa (JP); Akira Shimodaira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/357,738

(22) Filed: Jul. 24, 2023

(65) Prior Publication Data

US 2024/0241473 A1 Jul. 18, 2024

(30) Foreign Application Priority Data

Jan. 13, 2023 (JP) ................................ 2023-004080

(51) Int. Cl.

| | |
|---|---|
| ***G03G 21/00*** | (2006.01) |
| ***G03G 15/16*** | (2006.01) |
| ***G03G 21/10*** | (2006.01) |
| ***G03G 21/20*** | (2006.01) |

(52) U.S. Cl.

CPC ........... *G03G 21/10* (2013.01); *G03G 15/161* (2013.01); *G03G 21/0011* (2013.01); *G03G 21/20* (2013.01); *G03G 2221/0005* (2013.01)

(58) Field of Classification Search

CPC ............... G03G 15/161; G03G 15/168; G03G 21/0005; G03G 21/0011; G03G 21/10; G03G 21/20; G03G 2221/0005

See application file for complete search history.

(56) References Cited

U.S. PATENT DOCUMENTS

| | | | | |
|---|---|---|---|---|
| 2016/0313679 | A1* | 10/2016 | Mukai ................ | G03G 15/2025 |
| 2020/0249603 | A1* | 8/2020 | Ishigaya ............ | G03G 15/2032 |

FOREIGN PATENT DOCUMENTS

| | | | |
|---|---|---|---|
| JP | H05-307346 | A | 11/1993 |
| JP | 2007-163611 | A | 6/2007 |
| JP | 2018-054646 | A | 4/2018 |

* cited by examiner

*Primary Examiner* — Sophia S Chen

(74) *Attorney, Agent, or Firm* — Oliff PLC

(57) ABSTRACT

According to an aspect of the present disclosure, there is provided a cleaning device including: an elastic plate-shaped cleaning unit that has a tip portion disposed in contact with a surface of an object-to-be-cleaned which moves in a predetermined direction, is provided to be inclined in a direction facing a moving direction of the object-to-be-cleaned, and cleans hot-melt powder remaining on the object-to-be-cleaned; a facing unit that is disposed in contact with a back surface side of the object-to-be-cleaned and is provided to face the cleaning unit across the object-to-be-cleaned; and a heating unit that heats a contact portion of the cleaning unit to a temperature lower than a softening point of the powder by heating the facing unit.

20 Claims, 10 Drawing Sheets

NORMAL CONTACT STATE
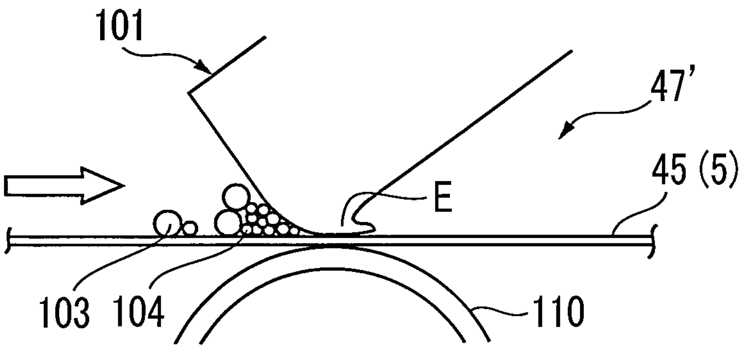
FIG. 7B
RELATED ART
IN LOW TEMPERATURE ENVIRONMENT
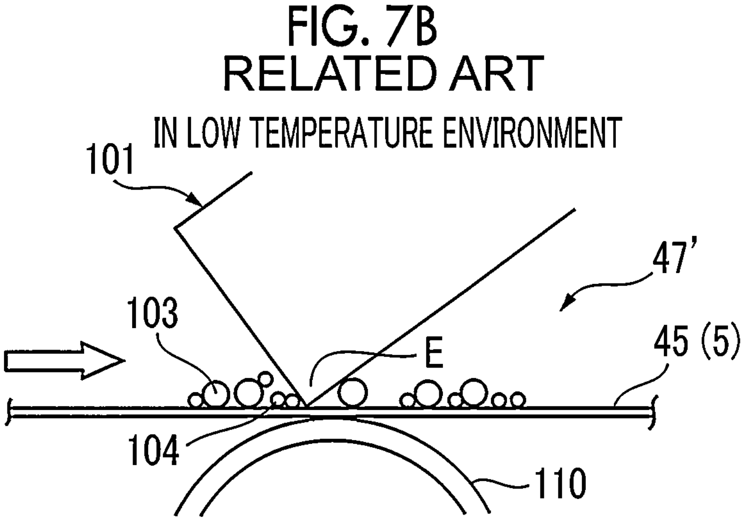
FIG. 7C
RELATED ART
WHEN SUPPLYING TONER BAND
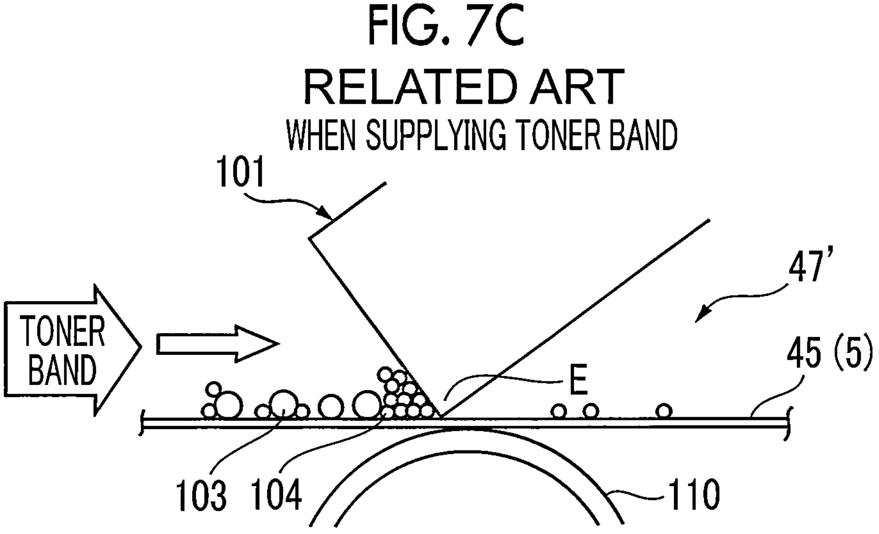

CLEANING DEVICE AND POWDER PROCESSING APPARATUS USING SAME

CROSS-REFERENCE TO RELATED APPLICATIONS

This application is based on and claims priority under 35 USC 119 from Japanese Patent Application No. 2023-004080 filed Jan. 13, 2023.

BACKGROUND

(i) Technical Field

The present invention relates to a cleaning device that cleans hot-melt powder remaining on an object-to-be-cleaned, and a powder processing apparatus using the cleaning device.

(ii) Related Art

In the related art, as a cleaning device of this type, for example, devices described in JP2007-163611A (DETAILED DESCRIPTION and FIG. 2), JP1993-307346A (Example and FIG. 1), and JP2018-054646A (DETAILED DESCRIPTION and FIG. 2) are already known.

JP2007-163611A (DETAILED DESCRIPTION and FIG. 2) discloses a cleaning device in which a cleaning blade is heated or cooled by a temperature adjusting unit in response to a change in an environment in which a device main body is installed, or a blade auxiliary member that complements an elastic change of the cleaning blade is provided, so that an elastic force of the cleaning blade is supplemented in response to a change in an environment in which the device main body is installed, and an appropriate contact angle and penetration amount of the cleaning blade with respect to an image carrier is always maintained.

JP1993-307346A (Example and FIG. 1) discloses a cleaning device in which a cleaning blade that comes into contact with an intermediate transfer belt that is an object-to-be-cleaned is provided, and the cleaning blade is fixed to a blade holder having good thermal conductivity, a holder is provided with a heating unit for heating the cleaning blade to improve the follow-up contact with a belt.

In JP2018-054646A (DETAILED DESCRIPTION and FIG. 2), the positional relationship between a cleaning blade, a heating element, and a recovery toner conveying unit in a vertical direction is the order of the cleaning blade, the heating element, and the recovery toner conveying unit from the top. Further, an image forming apparatus that covers the cleaning blade, a member that supports the cleaning blade, and a part of the heating element in a horizontal direction is disclosed.

SUMMARY

Aspects of non-limiting embodiments of the present disclosure relate to a cleaning device in which in cleaning a hot-melt powder remaining on an object-to-be-cleaned by an elastic plate-shaped cleaning unit, even in a low temperature environment in which the cleaning unit is likely to be cured, a good contact state of the cleaning unit with the object-to-be-cleaned is maintained and a deterioration of cleaning performance by the cleaning unit is improved, and a powder processing apparatus using the cleaning device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a cleaning device including: an elastic plate-shaped cleaning unit that has a tip portion disposed in contact with a surface of an object-to-be-cleaned which moves in a predetermined direction, is provided to be inclined in a direction facing a moving direction of the object-to-be-cleaned, and cleans hot-melt powder remaining on the object-to-be-cleaned; a facing unit that is disposed in contact with a back surface side of the object-to-be-cleaned and is provided to face the cleaning unit across the object-to-be-cleaned; and a heating unit that heats a contact portion of the cleaning unit to a temperature lower than a softening point of the powder by heating the facing unit.

BRIEF DESCRIPTION OF THE DRAWINGS

Exemplary embodiment(s) of the present invention will be described in detail based on the following figures, wherein:

FIG. 7A is an explanatory diagram schematically showing a normal contact state of a cleaning member of a cleaning device according to a first comparative form, FIG. 7B is an explanatory diagram schematically showing an example of an abnormal contact state of a contact member in a low temperature environment, and FIG. 7C is an explanatory diagram schematically showing a contact state of the cleaning member in a case where the toner band is supplied as a measure for improving the abnormal contact state of the cleaning member shown in FIG. 7B;

DETAILED DESCRIPTION

Outline of Exemplary Embodiment

Figure 1:
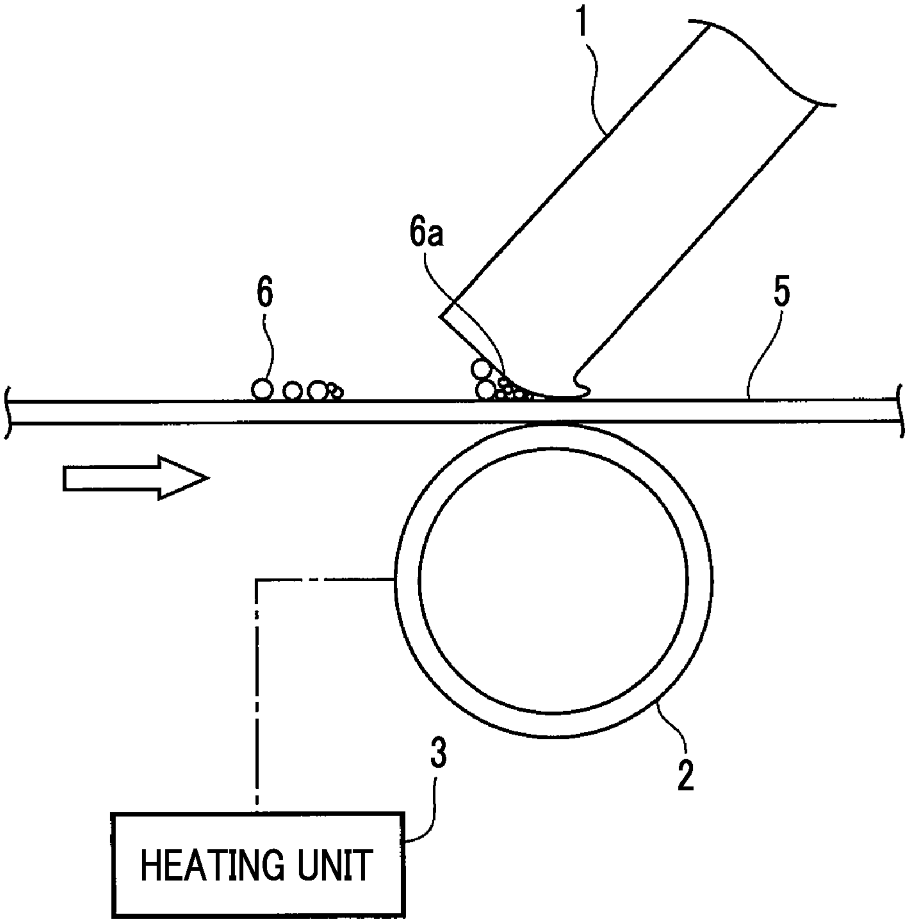
FIG. 1 is an explanatory diagram illustrating an outline of an exemplary embodiment of a cleaning device to which the present invention is applied.

FIG. 1 is an explanatory diagram illustrating an outline of an exemplary embodiment of a cleaning device to which the present disclosure is applied.

In FIG. 1, the cleaning device includes an elastic plate-shaped cleaning unit 1 that has a tip portion disposed in contact with a surface of an object-to-be-cleaned 5 which moves in a predetermined direction, is provided to be inclined in a direction facing a moving direction of the object-to-be-cleaned 5, and cleans hot-melt powder 6 remaining on the object-to-be-cleaned 5, a facing unit 2 that is disposed in contact with a back surface side of the object-to-be-cleaned 5 and is provided to face the cleaning unit 1 across the object-to-be-cleaned 5; and a heating unit 3 that heats a contact portion of the cleaning unit 1 to a temperature lower than a softening point of the powder 6 by heating the facing unit 2.

The cleaning device of this type is incorporated in a powder processing apparatus including a processing unit (not shown) that performs a predetermined process using the hot-melt powder 6, and cleans the powder 6 remaining on the object-to-be-cleaned 5 that moves in a predetermined direction.

In such technical units, the object-to-be-cleaned 5 is not limited to the object that circulates and rotates, and includes an object that moves in one direction. Further, the present invention is not limited to an image holding unit (photoreceptor, intermediate transfer body, or the like) that holds an image by the powder 6, and also broadly includes a transfer member of a transfer device to which the powder 6 adheres.

Further, the powder 6 is not limited to, for example, a toner used as an image forming powder in an electrophotographic method, and broadly includes coating particles as a coating powder. In this case, the powder 6 often contains the external additive **6*a* widely. The external additive 6*a* adheres to the surface of the powder 6 and controls chargeability, fluidity, and the like of the powder 6**.

Further, the cleaning unit 1 may be an elastic plate-shaped unit, and a cleaning member made of an elastic material may be supported on the support bracket, or widely includes those having a plate-shaped cleaning member using an elastic material such as rubber via a metal base material for the support bracket. In addition, in the present exemplary embodiment, it is needless to say that a device provided with a cleaning unit (for example, a brush-shaped cleaning member) having an aspect different from the cleaning unit 1 is also applied.

Further, there is a method of preventing the powder 6 from slipping by supplying a band-shaped image (toner band) of the powder (for example, toner) periodically or irregularly to the edge portion of the cleaning unit 1, and forming a dam (reservoir portion) by the external additive **6*a* contained in the powder 6. Although this method is based on the premise that the contact state of the cleaning unit 1 is poor and compensates for the poor contact state, excessive consumption of the powder 6** may occur. However, in the present exemplary embodiment, although it is not necessary to use this method, it is possible to use this method in combination.

Further, the facing unit 2 may be a separate body from the object-to-be-cleaned 5, or may be provided integrally. Further, in an aspect in which the facing unit 2 is a separate body, the facing unit 2 may be a rotating body that rotates following the movement of the object-to-be-cleaned 5, or includes any non-rotating body that does not rotate following the movement. Further, in addition to an aspect in which the facing unit 2 faces a contact portion region of the cleaning unit 1, there is an aspect in which the facing unit 2 faces the cleaning unit 1 at a position close to the cleaning unit 1 without facing the contact portion region of the cleaning unit 1.

Further, the heating unit 3 heats the tip portion of the cleaning unit 1 in order to prevent the tip portion of the cleaning unit 1 from being easily cured, for example, in a low temperature environment. Here, the heating unit 3 broadly includes the facing unit 2 as a heating target. Further, it is necessary to heat the contact portion of the cleaning unit 1 in a range lower than the softening point of the powder 6. In a case where the contact portion of the cleaning unit 1 is heated to a temperature equal to or higher than the softening point of the powder 6, the powder 6 may melt and the cleaning performance may be impaired.

As described above, in the cleaning device of the present exemplary embodiment, even in a low temperature environment, the tip portion of the cleaning unit 1 is softened by heating the facing unit 2, and a good contact state of the cleaning unit 1 with the object-to-be-cleaned 5 is maintained. Therefore, even in a case where the powder 6 is not supplied to the tip portion of the cleaning unit 1 periodically or irregularly, a dam caused by the external additive **6*a* contained in the powder 6 is secured at the tip portion of the cleaning unit 1, and the slip-through of the powder 6 is prevented. Further, since only the tip portion of the cleaning unit 1 is heated, a required heating temperature is low, and the powder 6** to be cleaned does not melt.

Next, for example, a representative aspect or a preferable aspect of the cleaning device according to the present exemplary embodiment will be described.

First, as a typical aspect of the heating unit 3, there is an aspect in which the facing unit 2 is heated to a temperature lower than the softening point of the powder 6. In this way, for example, it is preferable to control the heating temperature of the facing unit 2, because the contact portion of the cleaning unit 1 with the object-to-be-cleaned 5 is prevented from reaching a temperature equal to or higher than the softening point of the powder 6.

Further, from a viewpoint of maintaining good heat transferability of the heating unit 3, for example, an aspect is preferable in which the heating unit 3 heats the facing unit 2 in contact with the facing unit 2.

The followings are typical aspects of the present example.

(1) An aspect in which the facing unit 2 has a hollow portion, and the heating unit 3 is provided in the hollow portion.

(2) An aspect in which the heating unit 3 is disposed in contact with the surface of the facing unit 2.

(3) An aspect in which the facing unit 2 has a roll body made of a synthetic resin around a shaft made of metal, and the heating unit 3 heats the facing unit 2 in contact with both ends of the shaft made of metal.

Further, from a viewpoint that the heating unit 3 does not have a dedicated heat source, it is also possible to locally heat the facing unit 2 in a non-contact state by using the heat from another heat source.

As a typical aspect of the present example, an aspect is mentioned in which the heating unit 3 has an air flow unit (not shown) disposed between another heat source and the facing unit 2, and guides heat generated by the other heat source through the air flow unit to the facing unit 2.

Further, as a typical layout of the facing unit 2, an aspect in which the facing unit 2 is disposed to face the contact portion region of the cleaning unit 1 may be mentioned.

In the present example, in a case where the facing unit 2 moves in a state of being in contact with the object-to-be-cleaned 5, in order to maintain a relative positional relationship between the facing unit 2 and the cleaning unit 1, for example, it is preferable that the cleaning unit 1 moves following the movement of the facing unit 2.

Further, there is an aspect in which the facing unit 2 may be disposed to face the cleaning unit 1 at a position close to the contact portion region of the cleaning unit 1. In this case, since the facing unit 2 does not face the contact portion region of the cleaning unit 1, the amount of heat of the facing unit 2 heated by the heating unit 3 is transferred to the contact portion region of the cleaning unit 1 through the object-to-be-cleaned 5, and it is necessary that the contact portion region of the cleaning unit 1 is indirectly heated. Therefore, the term "close position" as used herein means a position sufficiently close to transfer the heat of the facing unit 2 to the contact portion region of the cleaning unit 1 in consideration of the thermal conductivity of the object-to-be-cleaned 5 and the like.

Further, in the powder processing apparatus including the cleaning device described above, for example, it is preferable to efficiently operate the heating unit 3 in a low temperature environment in which the cleaning unit 1 is likely to be cured. In this case, a temperature detecting unit (not shown) that detects the ambient environment temperature of the object-to-be-cleaned 5 and a control unit (not shown) that operates the heating unit 3 of the cleaning device in a case where the temperature detecting unit reaches a predetermined low temperature environment temperature condition may be provided.

Hereinafter, the present invention will be described in more detail on the basis of the exemplary embodiments shown in the accompanying drawings.

First Exemplary Embodiment

Overall Configuration of Image Forming Apparatus

Figure 2:
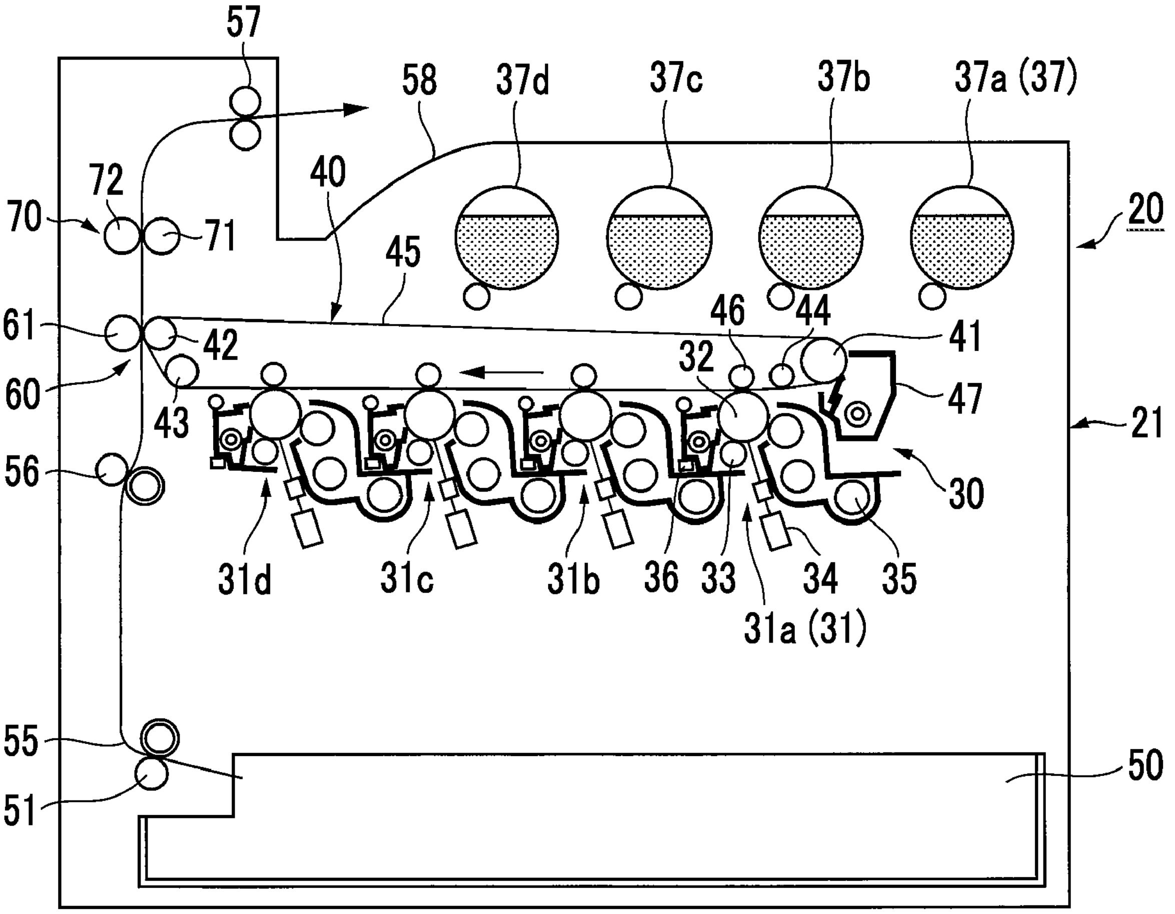
FIG. 2 is an explanatory diagram showing an overall configuration of an image forming apparatus, which is a powder processing apparatus according to a first exemplary embodiment.

FIG. 2 is an explanatory diagram showing an overall configuration of an image forming apparatus, which is the powder processing apparatus according to a first exemplary embodiment.

In FIG. 2, in an image forming apparatus 20, an image forming engine 30 that forms an image of a plurality of colors (four colors of yellow, magenta, cyan, and black in the present exemplary embodiment) is mount in an apparatus housing 21, a medium supply apparatus 50 that accommodates mediums such as paper is disposed below the image forming engine 30, and a medium conveying path 55 from the medium supply apparatus 50 is disposed in a substantially vertical direction.

In the present example, in the image forming engine 30, image forming units 31 (specifically, 31*a* to 31*d*) that forms the image of the plurality of colors are arranged in a substantially horizontal direction, a transfer module 40 including, for example, a belt-shaped intermediate transfer body 45 that circulates and moves along the arrangement direction of the image forming unit 31 is disposed above the image forming unit 31, and an image of each color formed by each of the image forming units 31 is transferred to the medium via the transfer module 40.

In the present exemplary embodiment, as shown in FIG. 2, the image forming units 31 (31*a* to 31*d*) form toner images, for example, for yellow, magenta, cyan, and black (the arrangement thereof is not necessarily in this order) in order from the upstream side in the circulation direction of the intermediate transfer body 45, and each of the image forming units 31 (31*a* to 31*b*) includes a photoreceptor 32, a charging device 33 (a charging roll in this example) that charges the photoreceptor 32 in advance, an exposure device (an LED writing head in this example) 34 that writes an electrostatic latent image on the corresponding photoreceptor 32 charged by the charging device 33, a developing device 35 that develops the electrostatic latent image formed on the photoreceptor 32 with the toner (for example, having a negative polarity in the present exemplary embodiment) of the corresponding color component, and a cleaning device 36 that cleans the residue on the photoreceptor 32.

Reference numerals 37 (specifically, 37*a* to 37*d*) indicate toner cartridges for supplying the color component toners to the corresponding developing devices 35.

Further, in the present exemplary embodiment, the transfer module 40 includes the belt-shaped intermediate transfer body 45 made of, for example, a polyimide resin spanned over a plurality of tension rolls 41 to 44, and for example, the tension roll 41 is used as a drive roll to circulate and move the intermediate transfer body 45. A transfer device (transfer roll in this example) 46 for primary transfer is disposed on a back surface of the intermediate transfer body 45 corresponding to the photoconductor 32 of each of the image forming units 31, and by applying a transfer voltage having a polarity opposite to a charging polarity of the toner to the transfer device 46, the toner image on the photoconductor 32 is electrostatically transferred to the intermediate transfer body 45 side.

Furthermore, a cleaning device 47 for the intermediate transfer body is disposed upstream of the image forming unit 31*a* on the most upstream side of the intermediate transfer body 45 to remove the residual toner on the intermediate transfer body 45.

In the present exemplary embodiment, the transfer device 60 for secondary transfer is disposed at a portion corresponding to the tension roll 42 downstream of the image forming unit 31*d* on the most downstream side of the intermediate transfer body 45 such that a primary transfer image on the intermediate transfer body 45 is secondarily transferred (collectively transferred) to the medium.

In the present example, the transfer device 60 includes a secondary transfer roll 61 disposed in pressure contact with the toner image holding surface side of the intermediate transfer body 45, and a backup roll (also serving as the tension roll 42 in the present example) that is disposed on the back surface side of the intermediate transfer body 45 and forms the counter electrode of the secondary transfer roll 61. For example, the secondary transfer roll 61 is grounded, and a secondary transfer voltage having the same polarity as the charging polarity of the toner is applied to the backup roll (the tension roll 42).

Further, a supply roll 51 that supplies the medium is provided in the medium supply apparatus 50, a transfer roll (not illustrated) is disposed in the medium conveying path 55, and a positioning roll 56 that supplies the medium to a secondary transfer portion at a predetermined timing is disposed in the medium conveying path 55 located immediately before the secondary transfer portion.

Furthermore, a fixing device 70 is provided in the medium conveying path 55 located downstream of the secondary transfer portion, and the fixing device 70 includes, for example, a heating fixing roll 71 having a built-in heater (not shown) is embedded, and a pressurizing fixing roll 72 that is arranged in pressure contact with the heating fixing roll 71 to rotate following the heating fixing roll 71. A discharge roll 57 that discharges the medium in the apparatus housing 21 is provided downstream of the fixing device 70 to sandwich, convey, and discharge the medium, and the medium is accommodated in a medium storage receiver 58 formed on the upper portion of the apparatus housing 21.

Although not illustrated in the present example, of course, a manual supply apparatus for medium or a double-sided recording module capable of double-sided recording of the medium may be separately provided.

Cleaning Device for Intermediate Transfer Body

Basic Configuration of Cleaning Device

Figure 3A:
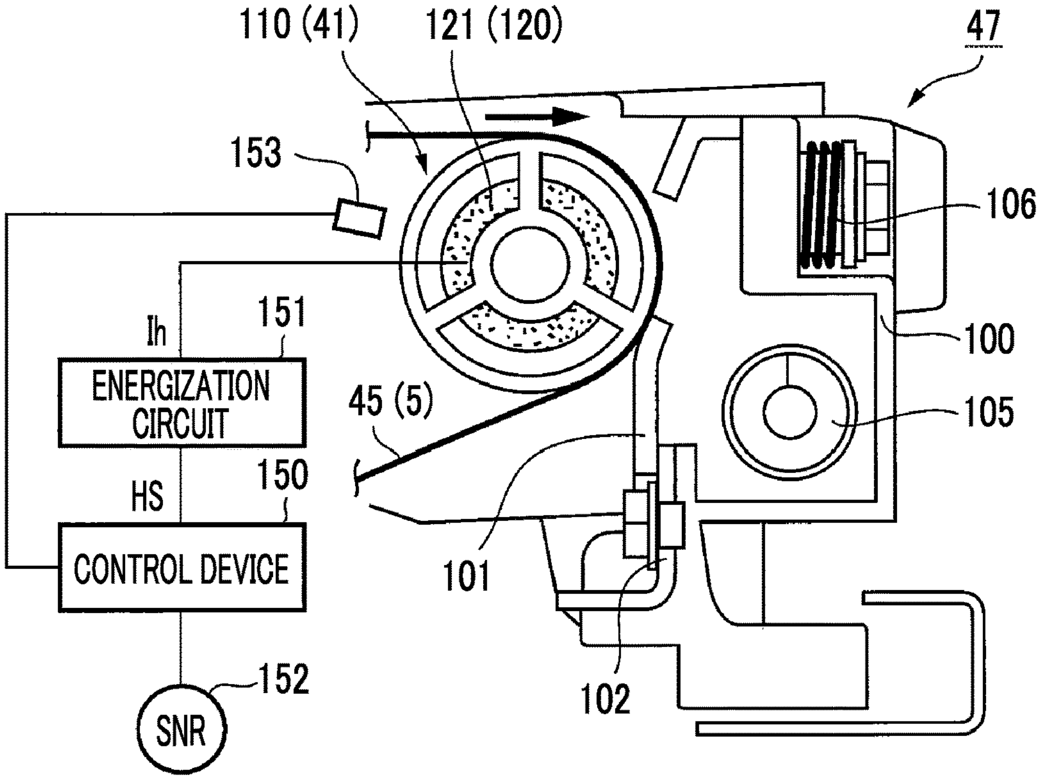
FIG. 3A is an explanatory diagram showing details of the cleaning device used in the first exemplary embodiment.

In the present example, as illustrated in FIG. 3A, the cleaning device 47 has a cleaning container 100 that accommodates a residue on the intermediate transfer body 45 as an object-to-be-cleaned 5 (see FIG. 1) and that opens toward the tension roll 41 of the intermediate transfer body 45, a plate-shaped cleaning member 101 (corresponding to the cleaning unit 1 in FIG. 1) for scraping off the residue on the photoconductor 32 is attached to the opening edge of the cleaning container 100, and a conveying member 105 for conveying the accommodated residue to be leveled is disposed in the cleaning container 100.

In the present example, the cleaning device 47 includes an facing roll 110 (corresponding to the facing unit 2 shown in FIG. 1) facing the cleaning member 101 including the tension roll 41 across the intermediate transfer body 45, and the facing roll 110 includes a heating component 120 (corresponding to the heating unit 3 shown in FIG. 1) for heating the facing roll 110.

Configuration Example of Cleaning Member

Figure 3B:
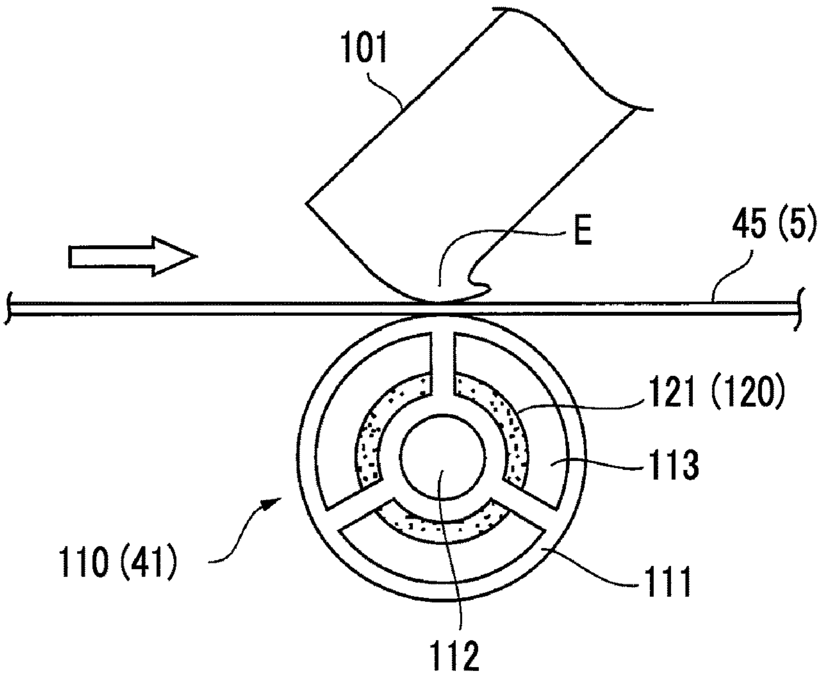
FIG. 3B is an explanatory diagram drawn by simplifying a part of the cleaning device shown in FIG. 3A.

In the present example, as shown in FIGS. 3A and 3B, the cleaning member 101 is a long thin plate-shaped member extending in the width direction orthogonal to the moving direction of the intermediate transfer body 45, the lateral direction of the plate-shaped member, which intersects the longitudinal direction and is away from the intermediate transfer body 45, is supported on the cleaning container 100 with a support bracket 102 made of metal such as SUS, for example, having an L-shaped cross section, and the edge portion E on the tip side of the plate-shaped member in the lateral direction is disposed in contact with the intermediate transfer body 45.

In the present example, the cleaning member 101 is disposed to be inclined such that the tip end side toward the intermediate transfer body 45 side faces the movement direction of the intermediate transfer body 45, and the inclination angle is selected within a predetermined range with respect to the tangential direction of the contact portion with the intermediate transfer body 45.

In the present example, as schematically shown in FIG. 3B, the cleaning member 101 is made of an elastic material such as polyurethane rubber, and in a case where the edge portion E on the tip end side comes into contact with the intermediate transfer body 45, the nip pressure (corresponding to the contact pressure) increases with respect to the intermediate transfer body 45 in a state where the edge portion E is pulled in the conveying direction of the intermediate transfer body 45. Therefore, as shown in FIG. 7A, the external additive (chargeable material, lubricating material, or the like) 104 of the toner 103 is blocked at the contact portion region of the edge portion E of the cleaning member 101, and a dam caused by the external additive 104 is formed in the edge portion E of the cleaning member 101. Therefore, the dam caused by the external additive 104 prevents the toner 103 from slipping through the edge portion E of the cleaning member 101.

In the present example, the cleaning member 101 is configured by one plate-shaped member, but the present invention is not limited to this, and for example, a configuration in which a plurality of plate-shaped members are stacked may be used.

Relationship Between Facing Roll and Cleaning Member

Further, in the present example, although the cleaning member 101 is positioned on the cleaning container 100 as shown in FIG. 3A, the cleaning container 100 is biased toward the facing roll 110 (also serving as the tension roll 41) by the biasing spring 106 and is positioned by the facing roll 110.

In the present example, since the facing roll 110 also serves as the tension roll 41 used as the drive roll, the position of the facing roll 110 may change instead of being fixed. However, in a case where the position of the tension roll 41 changes, the cleaning container 100 follows and moves via the intermediate transfer body 45 stretched over the tension roll 41, and along with this, the cleaning member 101 positioned in the cleaning container 100 follows and moves. Therefore, even in a case where the position of the facing roll 110 changes, the relative positional relationship between the cleaning member 101 and the facing roll 110 is maintained.

In the present example, the facing roll 110 also serves as the tension roll 41 used as a drive roll. However, the tension roll 41 may be a tension applying roll that applies tension to the intermediate transfer body 45. In this case, the position of the tension roll 41 changes in a case where the tension of the intermediate transfer body 45 is adjusted, but the cleaning member 101 moves following the movement of the facing roll 110.

Necessity of Heating Component

In the present example, since the cleaning member 101 is made of an elastic material using a rubber material, for example, in a low temperature environment, the nip pressure of the cleaning member 101 against the intermediate transfer body 45 may be reduced due to the curing of the rubber, the dam caused by the external additive 104 collapses, and the toner may slip through.

Therefore, in the present example, the heating component 120 for heating the edge portion E of the cleaning member 101 is adopted such that the rubber curing of the cleaning member 101 does not occur even in a low temperature environment.

Configuration Example of Heating Component

As shown in FIGS. 3A and 3B, the facing roll 110 has a roll body 111 made of metal in which a hollow portion 113 is formed around a rotating shaft 112, and a heat generation resistance layer 121 as a heating component 120 is provided in the hollow portion 113 around the rotating shaft 112.

In the present example, the heat generation resistance layer 121 is supplied with the heat generation current Ih from the energization circuit 151 based on the heating control signal HS from the control device 150, the heat generation resistance layer 121 generates heat, and the facing roll 110 is heated.

Other Configuration Examples of Heating Component

Figure 4A:
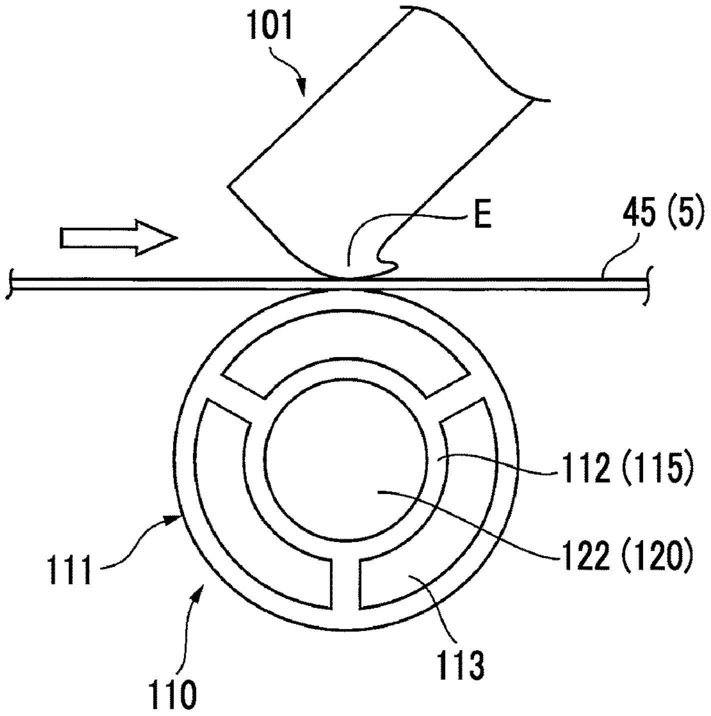
FIG. 4A is an explanatory diagram showing a first modification form of the cleaning device according to the first exemplary embodiment.
Figure 4B:
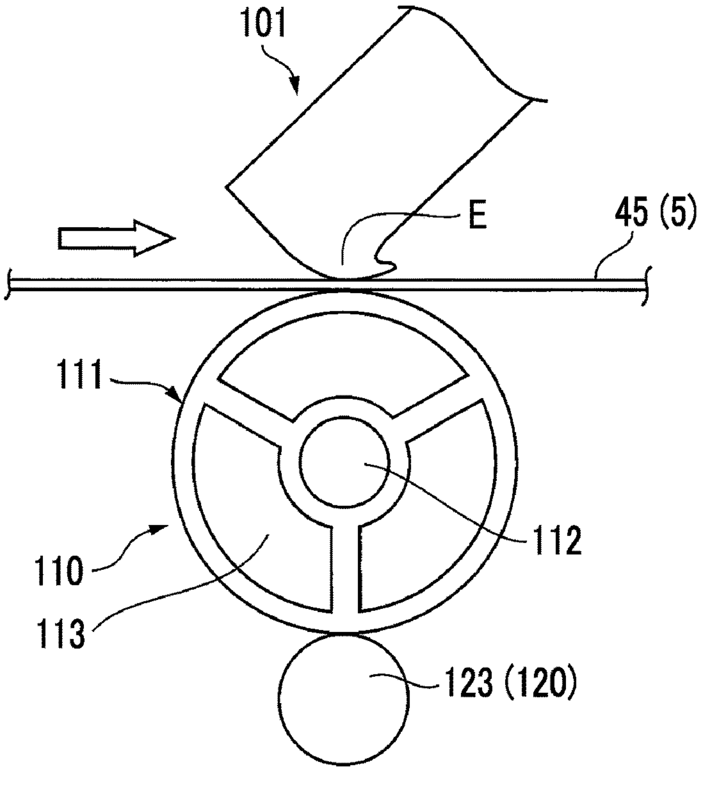
FIG. 4B is an explanatory diagram showing a second modification form of the cleaning device according to the first exemplary embodiment.

The heating component 120 is not limited to the one shown in FIGS. 3A and 3B, and may be the one shown in the first and second modification forms 1 and 2 as shown in FIGS. 4A and 4B.

First Modification Form

FIG. 4A shows a part of the cleaning device shown in the first modification form.

In FIG. 4A, the facing roll 110 has a roll body 111 in which a hollow portion 113 is formed around a rotating shaft 112, a hollow pipe 115 having a large diameter is used to ensure rigidity as the rotating shaft 112, and a heat roll 122 having a built-in heater as a heating component 120 is incorporated in the hollow portion of the hollow pipe 115.

In the present example, in a case where the heat roll 122 generates heat, the heat of the heat roll 122 is transferred through the roll body 111, so that the surface of the facing roll 110 is heated.

Second Modification Form

FIG. 4B shows a part of the cleaning device shown in the second modification form.

In FIG. 4B, the facing roll 110 has a roll body 111 in which a hollow portion 113 is formed around a rotating shaft 112, and an external heat roll 123 having a built-in heater as a heating component 120 is disposed in contact with the surface of the roll body 111 to be rotatably driven.

In the present example, since the external heat roll 123 directly heats the surface of the facing roll 110, it is possible to increase the heat transfer efficiency as compared with a case where the facing roll 110 is heated from the inside. Further, in the present example, since the facing roll 110 has a structure having the hollow portion 113, the heat radiation efficiency is high, and it is effective in accelerating the temperature drop of the facing roll 110 in a case where the heating by the external heat roll 123 is stopped.

Cleaning Device Control System

In the present example, as shown in FIG. 3A, a control device 150 is provided to control the heating of the cleaning device 47.

The control device 150 is configured by a microcomputer including various types of processors. In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the control device 150 receives temperature information from an environment temperature sensor 152 as a temperature detecting unit that detects the temperature of the ambient environment of the intermediate transfer body 45, and the surface temperature sensor 153 that detects the surface temperature of the facing roll 110, in the vicinity of the facing roll 110.

In the present example, the upper limit of the target temperature Ta (see FIG. 6) of the surface of the facing roll 110 is set to a temperature lower than the softening point of the toner.

Then, the control device 150 installs in advance a necessary program such as a "cleaning device heating control program (see FIG. 5)" in a memory (not shown), executes the cleaning device heating control program, based on the temperature information from the environment temperature sensor 152 and the surface temperature sensor 153, the edge portion E of the cleaning member 101 is heated, by heating the facing roll 110, in a situation where the rubber of the cleaning member 101 is likely to be cured in a low temperature environment, and a good contact state of the cleaning member 101 with respect to the intermediate transfer body 45 is maintained.

Heating Control Operation of Cleaning Device

Figure 5:
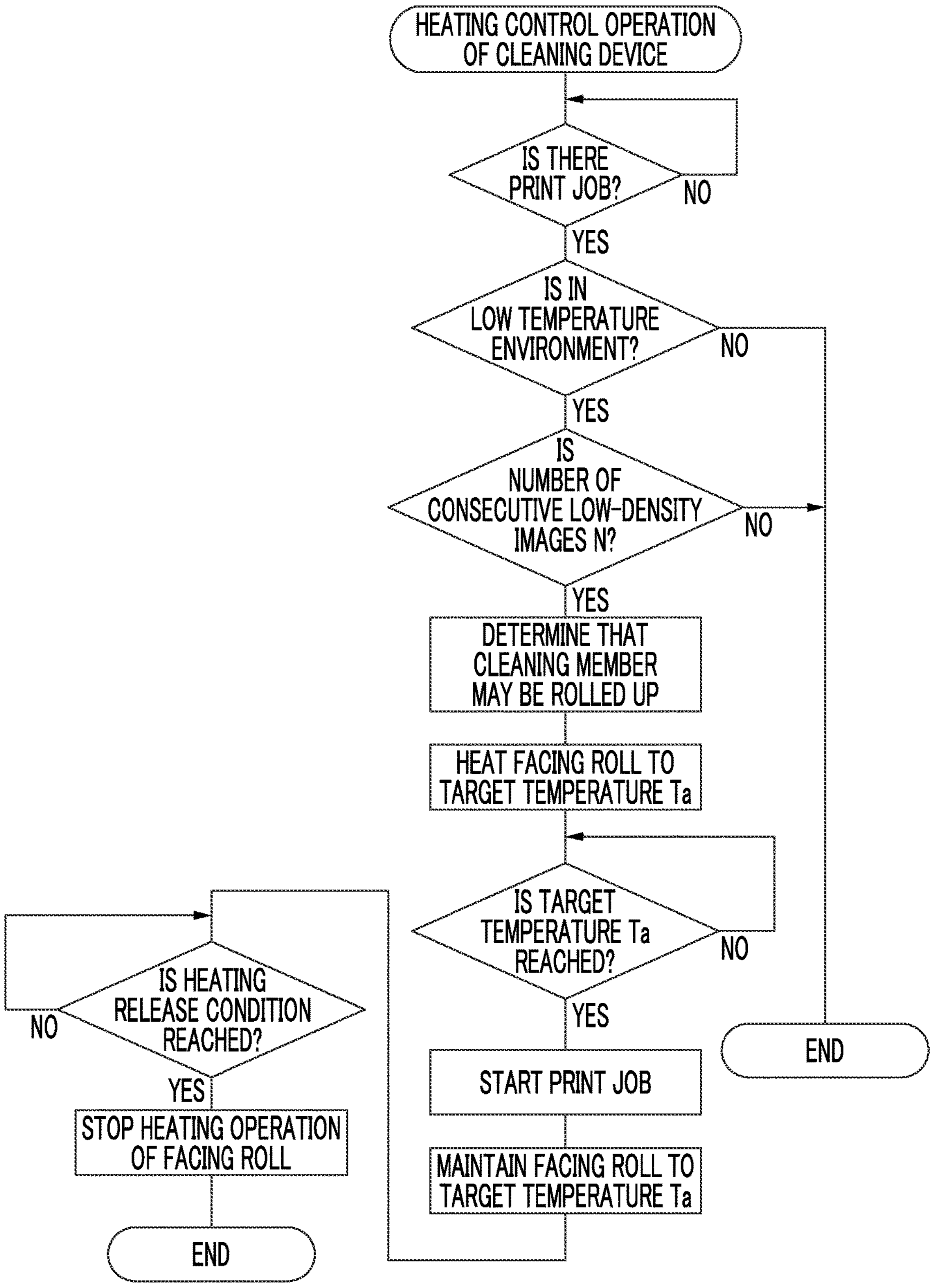
FIG. 5 is a flowchart showing an example of heating control of the cleaning device according to the first exemplary embodiment.

As shown in FIG. 5, in a case where an instruction of the print job is input from the user, the control device 150 determines whether or not the environment is in a low temperature environment based on the detection result from the environment temperature sensor 152.

The term "in a low temperature environment" as used herein refers to a temperature environment condition in which the cleaning member 101 is cured to reach a poor contact state with the intermediate transfer body 45, and means a low temperature and low humidity environment, for example, a temperature of 10° C. or less and a humidity of 15% or less.

In the present example, the control device 150 determines whether or not the number of consecutive low-density images has reached a specified value N, for example, considering the status of past print jobs, in a low temperature environment, and under a condition that the number of consecutive low-density images has reached the specified value N, the control device 150 determines that the cleaning member 101 may be rolled up.

In this case, as shown in FIG. 3, the control device 150 transmits the heating control signal HS to the energization circuit 151, and supplies the heat generation current Ih from the energization circuit 151 to the heat generation resistance layer 121 as the heating component 120.

In this state, the heat generation resistance layer 121 generates heat, heat from the heat generation resistance layer 121 is transferred to the surface of the facing roll 110 through the roll body 111, and the facing roll 110 is heated.

Here, since the control device 150 sets the target temperature Ta of the surface of the facing roll 110 to a temperature lower than the softening point of the toner, the facing roll 110 is heated until the surface of the facing roll 110 reaches the target temperature Ta. That is, since the surface of the facing roll 110 is detected by the surface temperature sensor 153, in a case where the surface temperature sensor 153 detects the target temperature Ta, the control device 150 stops the output of the heating control signal HS to the energization circuit 151, and the supply of the heat generation current Ih from the energization circuit 151 is stopped.

Figure 6A:
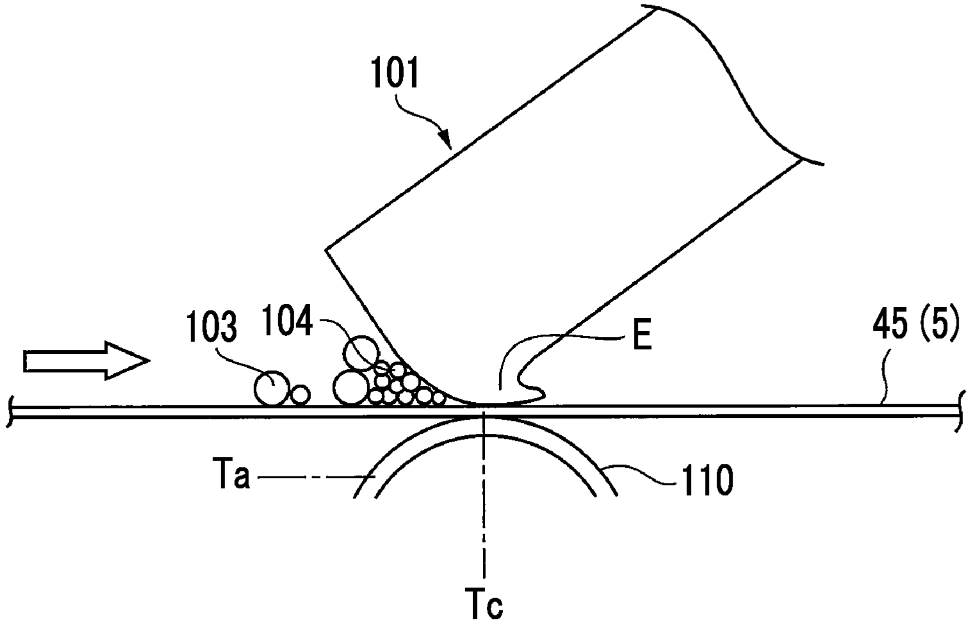
FIG. 6A is an explanatory diagram showing an operation of the cleaning device according to the first exemplary embodiment in a heating control.

In this state, as shown in FIG. 6A, the contact portion region of the edge portion E of the cleaning member 101 is heated by receiving heat from the facing roll 110, and is heated to the temperature Tc equal to or lower than the target temperature Ta of the facing roll 110. Therefore, the edge portion E of the cleaning member 101 maintains a good contact state with the intermediate transfer body 45, and the dam caused by the external additive 104 is blocked in a state where the edge portion E of the cleaning member 101 is pulled in the conveying direction of the intermediate transfer body 45. Therefore, the toner 103 remaining on the intermediate transfer body 45 is appropriately scraped off by the edge portion E of the cleaning member 101, and a good cleaning performance of the cleaning member 101 is maintained.

Further, since the contact portion region of the edge portion E of the cleaning member 101 comes into contact with the remaining toner 103 at the temperature Tc, a situation in which the toner 103 to be cleaned is softened and adheres to the edge portion E of the cleaning member 101 does not occur.

In this way, in a case where the edge portion E of the cleaning member 101 reaches the desired temperature condition, the control device 150 starts the print job.

Then, the control device 150 performs on/off control of heating of the heat generation resistance layer 121 as the heating component 120 such that the surface of the facing roll 110 is maintained at the target temperature Ta.

After that, the control device 150 determines whether or not a heating release condition is reached. The term "heating release condition" as used herein refers to a condition in which the print job is completed, the environment is no longer in a low temperature environment, or the number of consecutive low-density images is less than the specified value N.

In a case where the control device 150 determines that the "heating release condition" is reached, the control device 150 stops the heating operation of the facing roll 110.

In a case where the environment is not in a low temperature environment, or the environment is in a low temperature environment but the number of consecutive low-density images does not reach the specified value N, the control device 150 ends a series of processes without performing a heating operation on the cleaning device 47.

Third Modification Form

Figure 6B:
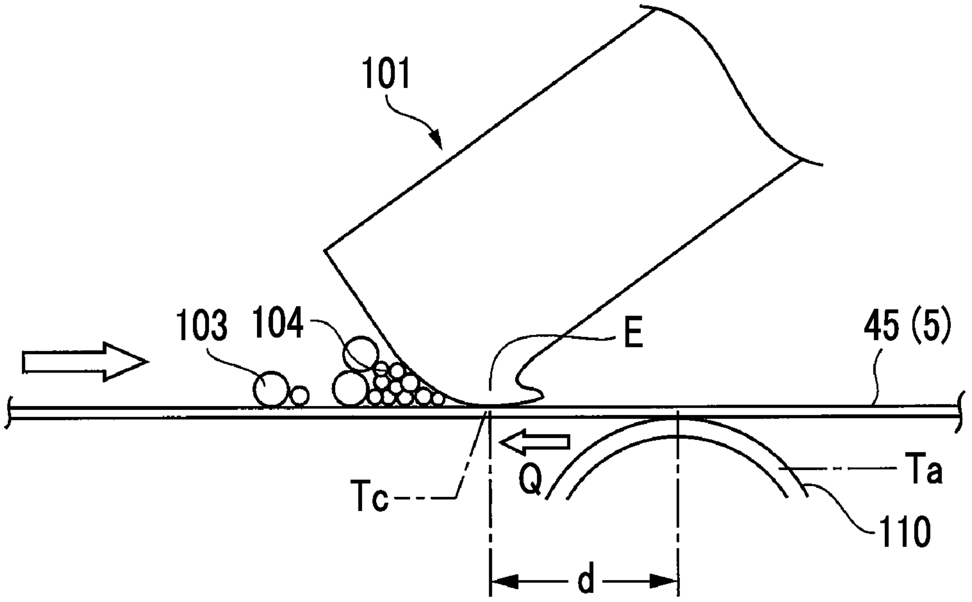
FIG. 6B is an explanatory diagram showing a third modification form of the cleaning device according to the first exemplary embodiment in which the layout is changed.

In the present exemplary embodiment, the facing roll 110 is disposed to face the contact portion region of the edge portion E of the cleaning member 101, but the present invention is not limited to this, and as in the third modification form shown in FIG. 6B, for example, the cleaning member 101 may be disposed offset from the contact portion region of the edge portion E.

In the present example, the facing roll 110 is disposed to face the cleaning member 101 at a position close to the contact portion region of the edge portion E of the cleaning member 101. In the present example, the amount of heat of the facing roll 110 heated by the heating component 120 is transferred to the contact portion region of the edge portion E of the cleaning member 101 through the intermediate transfer body 45, and the contact portion region of the cleaning member 101 is indirectly heated.

In this case, assuming that the distance between the contact portion region of the edge portion E of the cleaning member 101 and the contact portion region of the facing roll 110 with the intermediate transfer body 45 is d, it is presumed that as the distance d increases, the heat loss increases by the increase of the distance d in the process of heat transfer through the intermediate transfer body 45. Therefore, in a case where the heat loss can be obtained within an allowable range (for example, 20% or less), it is considered that the positional relationship may be treated as an offset arrangement due to "close position".

Here, the offset amount (corresponding to the distance d) is, for example, preferably 1 to 5 mm, although the offset amount depends on the member (thermal conductivity) and the configuration. In a case where the offset amount is large, the posture of the plate-shaped cleaning member 101 is not stable, and the cleaning performance may be deteriorated.

Next, in evaluating the performance of the cleaning device according to the present exemplary embodiment, the performance is compared with the performance of the cleaning device according to the first and second comparative forms.

First Comparative Form

The cleaning device 47' according to a first comparative form does not include the heating component of the first exemplary embodiment.

In this case, under an environmental condition that is not a low temperature environment, as shown in FIG. 7A, the contact portion region of the edge portion E of the cleaning member 101 maintains a normal contact state with the intermediate transfer body 45, the edge portion E of the cleaning member 101 is pulled in the conveying direction of the intermediate transfer body 45, a dam caused by the external additive 104 is formed at the edge portion E of the cleaning member 101, and the remaining toner 103 is appropriately scraped off.

However, assuming a case where continuous printing of low-density images is performed in a low temperature environment, as shown in FIG. 7B, the edge portion E of the cleaning member 101 is cured and the contact state with the intermediate transfer body 45 reaches a defective state. In this case, the nip pressure of the edge portion E of the cleaning member 101 may drop, the dam caused by the external additive 104 shown in FIG. 7A may collapse, and the remaining toner 103 may slip through the contact portion region of the edge portion E of the cleaning member 101.

In order to eliminate such a situation, as shown in FIG. 7C, in a case where the contact portion region of the edge portion E of the cleaning member 101 may be in a defective state as in a low temperature environment, a band-shaped image (toner band) formed of toner is regularly or irregularly supplied to the edge portion E of the cleaning member 101, a dam caused by the external additive 104 is forcibly formed on the edge portion E of the cleaning member 101, it is possible to improve the scraping performance of the remaining toner 103, and a toner loss for image formation occurs due to the supply of the toner band.

Second Comparative Form

Figure 8A:
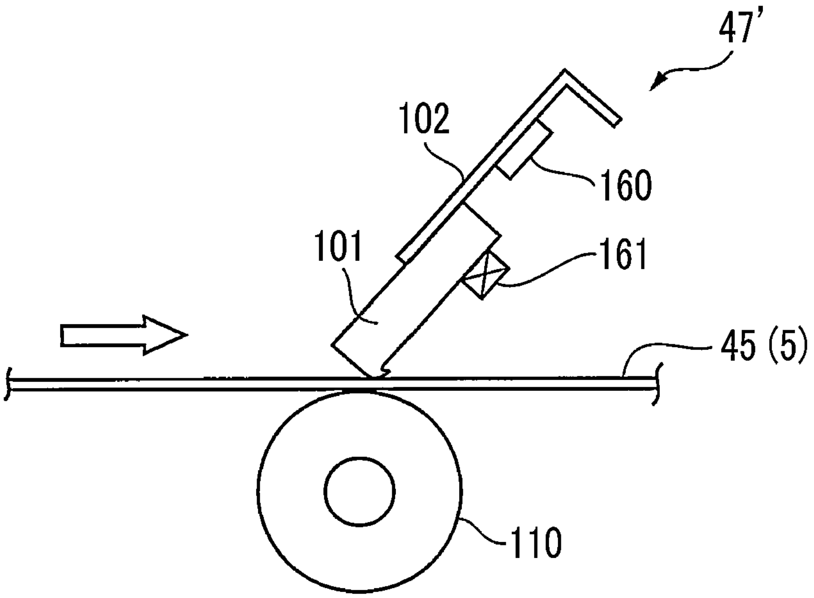
FIG. 8A RELATED ART
FIG. 8A is an explanatory diagram showing a part of a cleaning device according to a second comparative form.

FIG. 8A shows a part of the cleaning device according to a second comparative form.

In FIG. 8A, the cleaning device 47' according to a second comparative form includes the cleaning member 101 attached via the support bracket 102, a facing roll 110 disposed to face the cleaning member 101 across the intermediate transfer body 45, and a heater 160 that heats the cleaning member 101 provided on the support bracket 102. In FIG. 8A, reference numeral 161 is a temperature sensor that detects the temperature of the root portion of the cleaning member 101, and the heater 160 is heated and controlled based on the detection result of the temperature sensor 161.

Figure 8B:
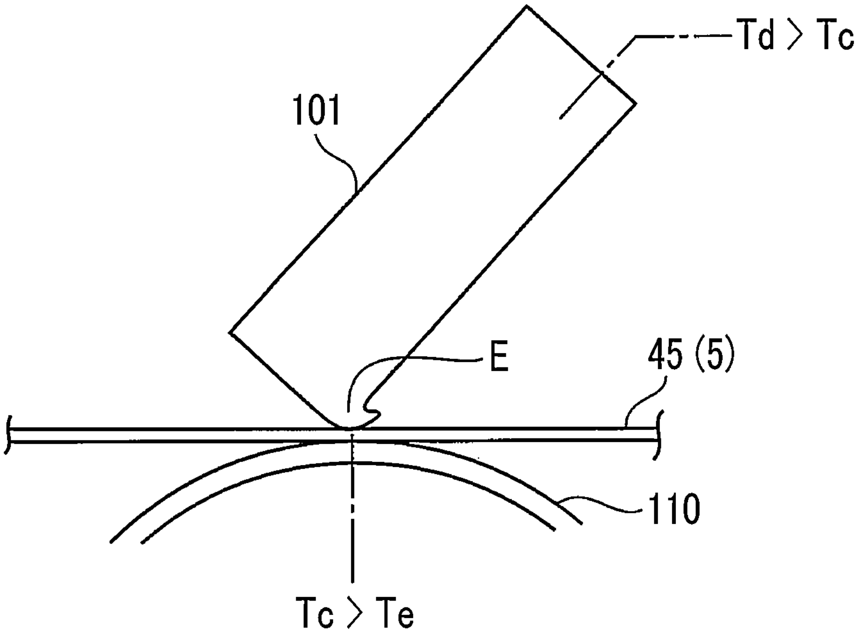
FIG. 8B RELATED ART
FIG. 8B is an explanatory diagram showing the performance of the cleaning device shown in FIG. 8A.

In the present example, for example, the heater 160 heats the support bracket 102 in a low temperature environment. In this case, as shown in FIG. 8B, in order to soften the edge portion E of the cleaning member 101, it is necessary to heat the support bracket 102 at a temperature higher than the softening temperature. In this case, the ambient temperature may rise, the temperature Tc of the edge portion E of the cleaning member 101 may become higher than the softening temperature Te of the toner, and the remaining toner may melt at the edge portion E of the cleaning member 101. Further, since the temperature Td of the root portion of the cleaning member 101 is higher than the temperature Tc of the edge portion E of the cleaning member 101, the root portion of the cleaning member 101 may be softened, the cleaning member 101 may be bent on the root portion side, and the cleaning member 101 may be rolled up.

Second Exemplary Embodiment

Figure 9A:
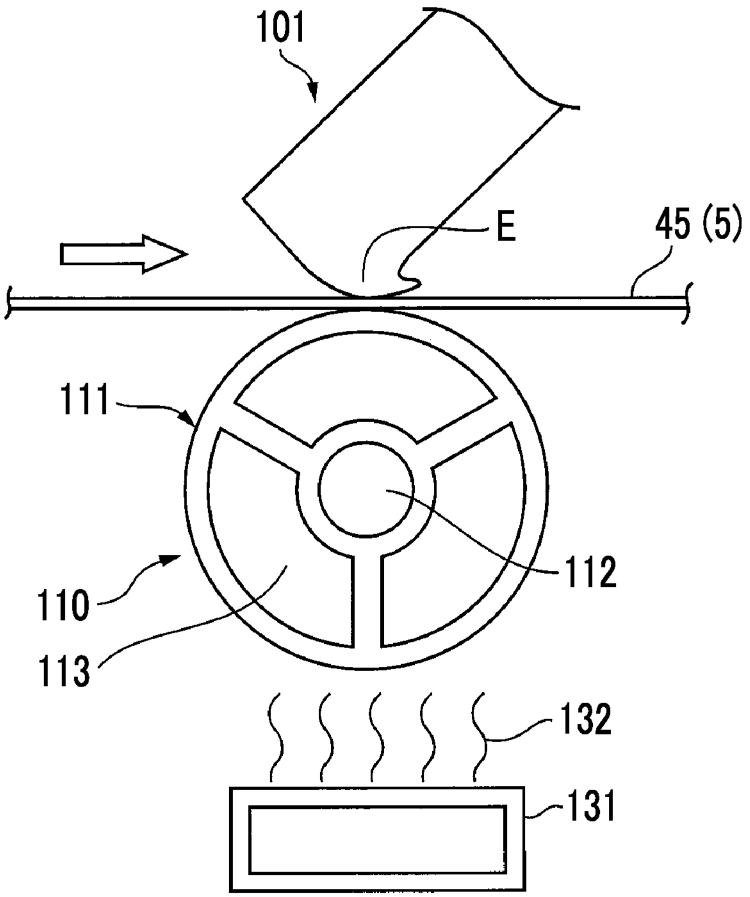
FIG. 9A is an explanatory diagram showing a part of a cleaning device according to a second exemplary embodiment.

FIG. 9A is an explanatory diagram showing a part of a cleaning device according to a second exemplary embodiment.

In the present example, the basic configuration of the cleaning device 47 includes the cleaning member 101, and the facing roll 110 that faces the cleaning member 101 across the intermediate transfer body 45, as in the first exemplary embodiment, but is different from the first exemplary embodiment in that as the heating component 120 that heats the facing roll 110, the facing roll 110 is locally heated in a non-contact state by using the heat of another heat source.

Figure 9B:
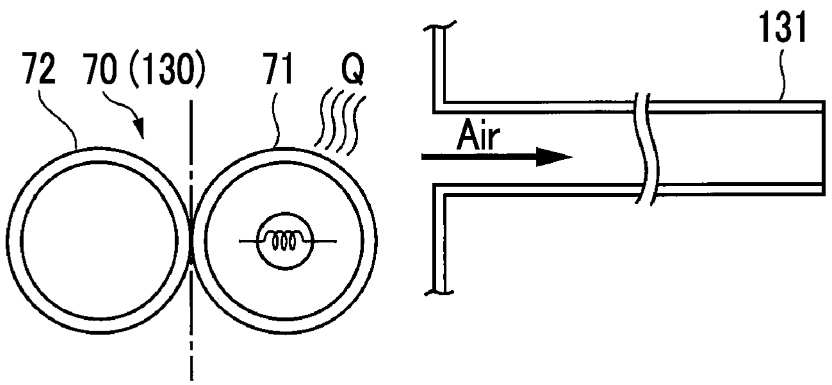
FIG. 9B is an explanatory diagram showing an example of a heating source of heating air shown in FIG. 9A.

In the present example, as another heat source 130, as shown in FIG. 9B, a fixing device 70 (which includes a heating fixing roll 71 and a pressurizing fixing roll 72) is used, an air exhaust duct 131 is disposed between the fixing device 70 and the facing roll 110, and heat generated by the fixing device 70 is discharged to the outside of the apparatus housing 21 (see FIG. 2) through the air exhaust duct 131.

In particular, in the present example, the air exhaust duct 131 is disposed close to the lower side of the facing roll 110.

Therefore, in the present exemplary embodiment, the heat Q generated in the fixing device 70, which is another heat source 130, is discharged to the outside together with the air through the air exhaust duct 131, but while passing through the air exhaust duct 131, the heat Q heats the air in the vicinity of the upper part of the air exhaust duct 131. Therefore, when the heated air in the air exhaust duct 131 passes through the portion corresponding to the facing roll 110, the heated air heats the air in the region between the air exhaust duct 131 and the facing roll 110. As a result, the heated air 132 rises toward the facing roll 110 and is guided to locally heat the facing roll 110.

As described above, in the present example, it is possible to heat the facing roll 110 without using the dedicated heating component 120 as in the first exemplary embodiment.

Third Exemplary Embodiment

Figure 10A:
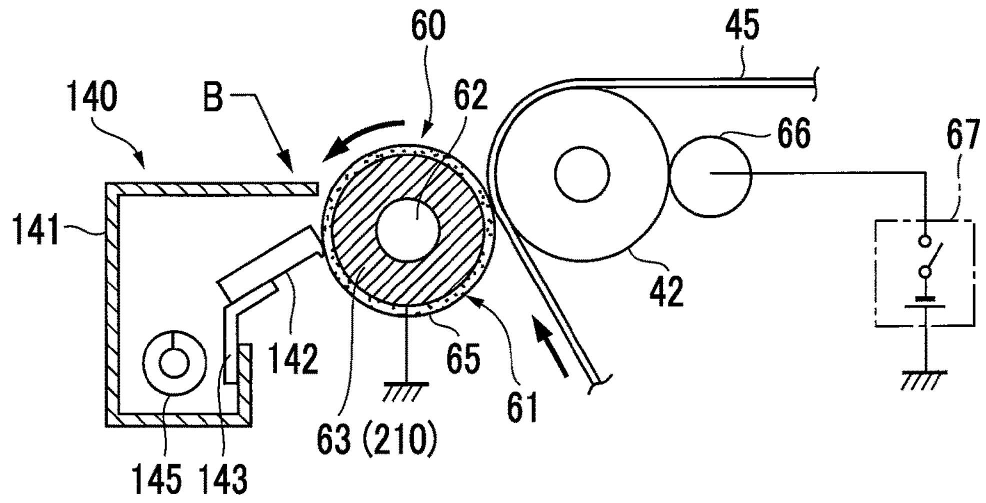
FIG. 10A is an explanatory diagram showing a part of a cleaning device according to a third exemplary embodiment.

FIG. 10A shows a part of a cleaning device according to a third exemplary embodiment.

In FIG. 10A, the cleaning device 140 according to the third exemplary embodiment is different from the cleaning device 47 according to the first and second exemplary embodiments in that residues such as toner remaining on the secondary transfer roll 61 of the transfer device 60 for secondary transfer is cleaned. Components that are the same as in the first exemplary embodiment will be assigned with the same reference numerals, and detailed description thereof will be omitted herein.

In the present example, the transfer device 60 for secondary transfer uses the tension roll 42 facing the secondary transfer roll 61 across the intermediate transfer body 45 as a backup roll, the power supply roll 66 is disposed in contact with the backup roll, and a transfer power supply 67 is connected to the power supply roll 66 to apply a transfer bias.

Further, the cleaning device 140 has a cleaning container 141 that accommodates a residue on the coating tube 65 formed on the surface of the secondary transfer roll 61 as the object-to-be-cleaned 5 (see FIG. 1) and that opens toward the secondary transfer roll 61, a plate-shaped cleaning member 142 is attached to the opening edge of the cleaning container 141 via a support bracket 143, and a conveying member 145 for conveying the accommodated residue to be leveled is disposed in the cleaning container 141.

Further, in the present example, the secondary transfer roll 61 has a roll body 63 made of a synthetic resin such as urethane foam around the rotating shaft 62 made of metal, and a coating tube 65 made of, for example, polyimide is provided on the surface of the roll body 63.

In particular, in the present example, the object-to-be-cleaned is the coating tube 65 of the secondary transfer roll 61.

Further, in the present example, the roll body 63 of the secondary transfer roll 61 functions as the facing roll 210 facing the cleaning member 142 across the coating tube 65, and the facing roll 210 is integrated with the coating tube 65, but also serves as an element of the cleaning device 140.

Further, in the present example, the facing roll 210 is provided with a heating component 120 (corresponding to the heating unit 3 shown in FIG. 1) that heats the facing roll 210.

Figure 10B:
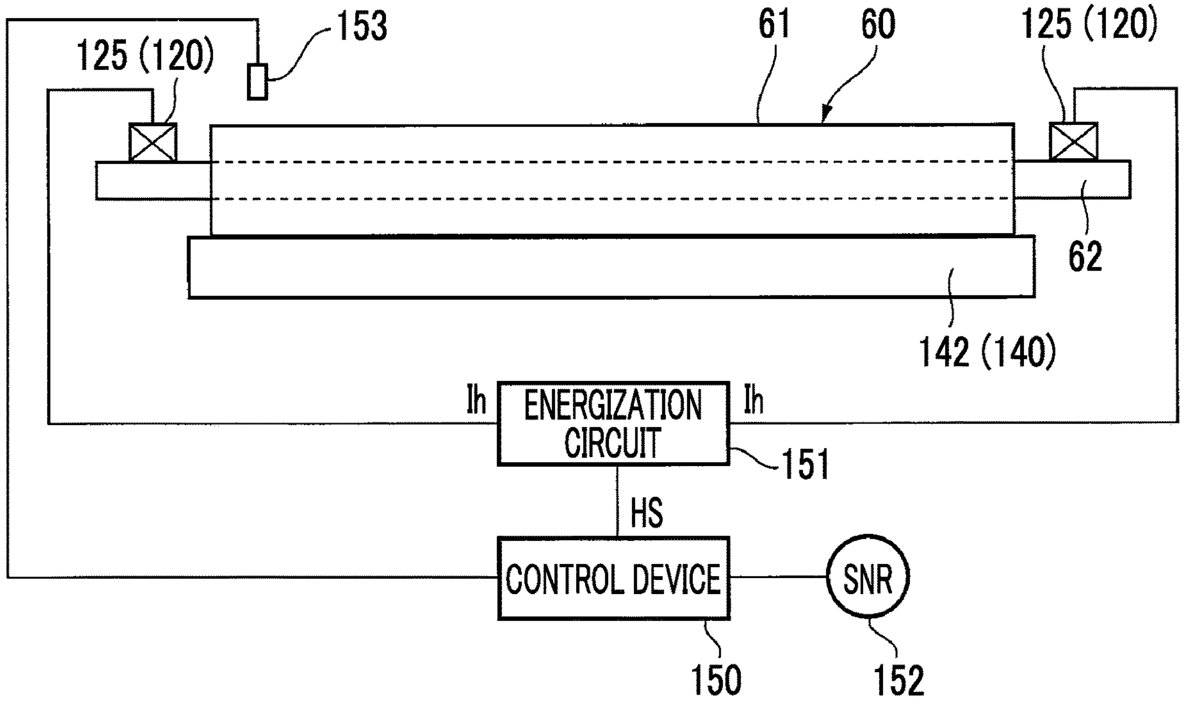
FIG. 10B is a view in a direction of an arrow B shown in FIG. 10A.

The heating components 120, as shown in FIG. 10B, are disposed in contact with the heaters 125 at both ends of a rotating shaft 62 made of metal, the heater 125 is supplied with the heat generation current Ih from the energization circuit 151 based on the heating control signal HS from the control device 150, the heater 125 generates heat, and the heat from the heater 125 is transferred to the rotating shaft 62 and the roll body 63 to heat the facing roll 210.

As described above, in the present example, the cleaning device 140 applied to the transfer device 60 for secondary transfer is disclosed, and it is possible to properly clean the covering tube 65 of the secondary transfer roll 61 with the cleaning member 142 even when continuous printing low-density images in a low temperature environment.

Supplementary Notes (((1)))

A cleaning device comprising:

an elastic plate-shaped cleaning unit that has a tip portion disposed in contact with a surface of an object-to-be-cleaned which moves in a predetermined direction, is provided to be inclined in a direction facing a moving direction of the object-to-be-cleaned, and cleans hot-melt powder remaining on the object-to-be-cleaned;

a facing unit that is disposed in contact with a back surface side of the object-to-be-cleaned and is provided to face the cleaning unit across the object-to-be-cleaned; and a heating unit that heats a contact portion of the cleaning unit to a temperature lower than a softening point of the powder by heating the facing unit.

(((2)))

In the cleaning device according to (((1))), wherein the heating unit heats the facing unit to a temperature lower than the softening point of the powder.

(((3)))

In the cleaning device according to (((1))) or (((2)))), wherein the heating unit heats the facing unit in contact with the facing unit.

(((4)))

In the cleaning device according to (((3)))), wherein the facing unit has a hollow portion, and the heating unit is provided in the hollow portion.

(((5)))

In the cleaning device according to (((3)))), wherein the heating unit is disposed in contact with a surface of the facing unit.

(((6)))

In the cleaning device according to (((3)))), wherein the facing unit has a roll body made of a synthetic resin around a shaft made of metal, and the heating unit heats the facing unit in contact with both ends of the shaft.

(((7)))

In the cleaning device according to (((1))) or (((2)))), wherein the heating unit uses heat from another heat source to locally heat the facing unit in a non-contact state.

(((8)))

In the cleaning device according to (((7)))), wherein the heating unit has an air flow unit disposed between the other heat source and the facing unit, and guides heat generated by the other heat source through the air flow unit to the facing unit.

(((9)))

In the cleaning device according to any one of (((1))) to (((8))), wherein the facing unit is disposed to face a contact portion region of the cleaning unit.

(((10)))

In the cleaning device according to (((9)))), wherein the facing unit moves in a state of being in contact with the object-to-be-cleaned, and the cleaning unit moves following a movement of the facing unit.

(((11)))

In the cleaning device according to any one of (((1))) to (((8))), wherein the facing unit is disposed at a position close to a contact portion region of the cleaning unit to face the cleaning unit.

(((12)))

A powder processing apparatus comprising:

a processing unit that performs a predetermined process using a hot-melt powder; and the cleaning device according to any one of (((1))) to (((11))) that cleans the powder remaining on the object-to-be-cleaned that moves in the predetermined direction.

(((13)))

In the powder processing apparatus according to (((12)))), a temperature detecting unit that detects an ambient environment temperature of the object-to-be-cleaned; and a control unit that operates the heating unit of the cleaning device in a case where the temperature detecting unit reaches a predetermined low temperature environment temperature condition.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning device comprising:

an elastic plate-shaped cleaning unit that has a tip portion disposed in contact with a surface of an object-to-be-cleaned which moves in a predetermined direction, is provided to be inclined in a direction facing a moving direction of the object-to-be-cleaned, and cleans hot-melt powder remaining on the object-to-be-cleaned;

a facing unit that is disposed in contact with a back surface side of the object-to-be-cleaned and is provided to face the cleaning unit across the object-to-be-cleaned; and a heating unit that heats a contact portion of the cleaning unit to a temperature lower than a softening point of the powder by heating the facing unit.

2. The cleaning device according to claim 1, wherein the heating unit heats the facing unit to a temperature lower than the softening point of the powder.

3. A powder processing apparatus comprising:

a processing unit that performs a predetermined process using a hot-melt powder; and the cleaning device according to claim 2 that cleans the powder remaining on the object-to-be-cleaned that moves in the predetermined direction.

4. The cleaning device according to claim 1, wherein the heating unit heats the facing unit in contact with the facing unit.

5. The cleaning device according to claim 4, wherein the facing unit has a hollow portion, and the heating unit is provided in the hollow portion.

6. A powder processing apparatus comprising:

a processing unit that performs a predetermined process using a hot-melt powder; and the cleaning device according to claim 5 that cleans the powder remaining on the object-to-be-cleaned that moves in the predetermined direction.

7. The cleaning device according to claim 4, wherein the heating unit is disposed in contact with a surface of the facing unit.

8. A powder processing apparatus comprising:

a processing unit that performs a predetermined process using a hot-melt powder; and the cleaning device according to claim 7 that cleans the powder remaining on the object-to-be-cleaned that moves in the predetermined direction.

9. The cleaning device according to claim 4, wherein the facing unit has a roll body made of a synthetic resin around a shaft made of metal, and the heating unit heats the facing unit in contact with both ends of the shaft.

10. A powder processing apparatus comprising:

a processing unit that performs a predetermined process using a hot-melt powder; and the cleaning device according to claim 9 that cleans the powder remaining on the object-to-be-cleaned that moves in the predetermined direction.

11. A powder processing apparatus comprising:

a processing unit that performs a predetermined process using a hot-melt powder; and the cleaning device according to claim 4 that cleans the powder remaining on the object-to-be-cleaned that moves in the predetermined direction.

12. The cleaning device according to claim 1, wherein the heating unit uses heat from a heat source to locally heat the facing unit in a non-contact state.

13. The cleaning device according to claim 12, wherein the heating unit has an air flow unit disposed between the heat source and the facing unit, and guides heat generated by the heat source through the air flow unit to the facing unit.

14. A powder processing apparatus comprising:

a processing unit that performs a predetermined process using a hot-melt powder; and the cleaning device according to claim 13 that cleans the powder remaining on the object-to-be-cleaned that moves in the predetermined direction.

15. A powder processing apparatus comprising:

a processing unit that performs a predetermined process using a hot-melt powder; and the cleaning device according to claim 12 that cleans the powder remaining on the object-to-be-cleaned that moves in the predetermined direction.

16. The cleaning device according to claim 1, wherein the facing unit is disposed to face a contact portion region of the cleaning unit.

17. The cleaning device according to claim 16, wherein the facing unit moves in a state of being in contact with the object-to-be-cleaned, and the cleaning unit moves following a movement of the facing unit.

18. The cleaning device according to claim 1, wherein the facing unit is disposed at a position close to a contact portion region of the cleaning unit to face the cleaning unit.

19. A powder processing apparatus comprising:

a processing unit that performs a predetermined process using a hot-melt powder; and the cleaning device according to claim 1 that cleans the powder remaining on the object-to-be-cleaned that moves in the predetermined direction.

20. The powder processing apparatus according to claim 19, further comprising:

a temperature detecting unit that detects an ambient environment temperature of the object-to-be-cleaned; and a control unit that operates the heating unit of the cleaning device in a case where the temperature detecting unit reaches a predetermined low temperature environment temperature condition.

* * * * *